US 11,626,830 B2

(12) United States Patent
Edwards et al.

(10) Patent No.: US 11,626,830 B2
(45) Date of Patent: Apr. 11, 2023

(54) ENERGY MANAGEMENT SYSTEM

(71) Applicant: Bluevolt Solar Pty. Ltd., Elanora Heights (AU)

(72) Inventors: Matthew Edwards, Elanora Heights (AU); Catherine Chan, Kensington (AU); Alison Ciesla, Tamarama (AU)

(73) Assignee: Bluevolt Solar Pty. Ltd., Elanora Heights (AU)

( * ) Notice: Subject to any disclaimer, the term of this patent is extended or adjusted under 35 U.S.C. 154(b) by 56 days.

(21) Appl. No.: 16/766,382

(22) PCT Filed: Nov. 23, 2018

(86) PCT No.: PCT/AU2018/000229
§ 371 (c)(1),
(2) Date: May 22, 2020

(87) PCT Pub. No.: WO2019/100100
PCT Pub. Date: May 31, 2019

(65) Prior Publication Data
US 2020/0363829 A1  Nov. 19, 2020

(30) Foreign Application Priority Data
Nov. 23, 2017  (AU) .............................. 2017904738

(51) Int. Cl.
*H02S 20/30* (2014.01)
*G05F 1/67* (2006.01)
(Continued)

(52) U.S. Cl.
CPC ................ *H02S 20/30* (2014.12); *G05F 1/67* (2013.01); *G06Q 50/06* (2013.01); *H02J 1/10* (2013.01);
(Continued)

(58) Field of Classification Search
CPC .... G05F 1/67; G06Q 50/06; H02J 3/32; H02J 3/381; H02J 7/34; H02J 2300/24;
(Continued)

(56) References Cited

U.S. PATENT DOCUMENTS

2001/0023703 A1*  9/2001  Kondo .................... H02S 50/10
                                                                  136/291
2010/0264739 A1  10/2010  Errington
(Continued)

OTHER PUBLICATIONS

International Search Report and Written Opinion for corresponding International application No. PCT/AU2018/000229 dated Feb. 4, 2019 (14 pages).
(Continued)

*Primary Examiner* — Hal Kaplan
(74) *Attorney, Agent, or Firm* — Mendelsohn Dunleavy, P.C.

(57) ABSTRACT

The present disclosure is directed to an energy management system that allows leveraging DC energy at user premises. The system allows for use of local or remote DC energy generated by photovoltaic modules or a battery pack. The system comprises a premises electricity network interface arranged to deliver and draw energy to and from a premises electricity network; a premises energy measurement module arranged to measure the amount of energy required by the premises electricity network; a DC energy input arranged to receive energy from one or more DC energy sources; and an energy analytics module arranged to receive data from the energy measurement module and, based on the received data, calculate an amount of energy to be delivered to the premises electricity network via the premises electricity network interface.

23 Claims, 6 Drawing Sheets

(51) Int. Cl.
  *G06Q 50/06* (2012.01)
  *H02J 3/38* (2006.01)
  *H02J 7/34* (2006.01)
  *H02J 3/46* (2006.01)
  *H02J 1/10* (2006.01)

(52) U.S. Cl.
  CPC ................ *H02J 3/381* (2013.01); *H02J 3/46* (2013.01); *H02J 7/34* (2013.01); *H02J 2300/22* (2020.01); *H02J 2300/24* (2020.01)

(58) Field of Classification Search
  CPC . H02J 1/10; H02J 3/46; H02J 2300/22; H02S 20/30
  USPC .......................................................... 307/43
  See application file for complete search history.

(56) References Cited

U.S. PATENT DOCUMENTS

2011/0004357 A1  1/2011  Mathiowetz
2013/0345891 A1  12/2013  Beyerle et al.

OTHER PUBLICATIONS

Home Energy Management Systems, www.choice.com.au, 2017 [retrieved on Mar. 20, 2019] Retrieved from the Internet: <URL: https://www.choice.com.au/home-improvement/energy-saving/reducing-your-carbon-footprint/articles/home-energy management-systems> (13 pages).

A comparison of home energy management systems in Australia, www.solarchoice.net.au, 2017 [retrieved on Mar. 20, 2019] Retrieved from the Internet: <URL: https://www.solarchoice.net.au/blog/comparison-home-energy-management-systems-australia> (6 pages).

\* cited by examiner

ENERGY MANAGEMENT SYSTEM

TECHNICAL FIELD

The present technology relates to an energy management system and a method of managing energy within premises, in particular, the technology is directed to a system that is capable of distributing energy from one or more photovoltaic modules.

BACKGROUND

Despite a continuous decrease in the cost of solar energy in the last decade, there are large segments of the world population that cannot access conventional solar. These include people living in apartment buildings, in large cities, people in rural areas, and people with suboptimal orientation of rooftop spaces. It is noted that most rooftops are at the wrong angle for solar noon or do not face directly to the north or south.

Most conventional PV systems require installation by an electrician or technician and are not modular or versatile in their application. In general, they also do not have analytics and are ill-suited for smart-home or smart-grid application. There is a need in the art for improved solar systems which provide versatility and are easy to install.

SUMMARY

In accordance with the first aspect, the present invention provides an energy management system comprising:

a premises electricity network interface arranged to deliver and draw energy to and from a premises electricity network;

a premises energy measurement module arranged to measure the amount of energy required by the premises electricity network;

a DC energy input arranged to receive energy from one or more DC energy sources;

an energy analytics module arranged to receive data from the energy measurement module and, based on the received data, calculate an amount of energy to be delivered to the premises electricity network via the premises electricity network interface.

In some embodiments, the energy management system comprises an electricity grid management module connected to the premises electricity network interface and arranged to detect whether solar energy is available on the electricity grid the premises is connected to.

In an embodiment the DC energy sources comprise one or more photovoltaic modules. The photovoltaic modules may be located at the premises where the energy management system is installed. Alternatively, if the energy management module is installed at a residential unit, the photovoltaic modules can be installed on the roof of the residential building. The photovoltaic modules may be wired to the meter box (traditional installation) or the photovoltaic modules may be self-installed by the user and plugged in to the energy management system.

In alternative embodiments, where no local DC energy sources are connected to the DC energy input, the system is arranged to verify, via the grid management module, that remote solar energy is available to be drawn from the electricity grid and deliver solar energy to the premises electricity network. The system may further comprise a data network interface, such as a wireless network interface, arranged to connect to a system administrator cloud platform and search for available remote solar energy.

In some embodiments, the energy analytics module is arranged to avoid any energy received via the DC energy input to be delivered to the external electricity grid. In these instances, the amount of energy delivered is always equal or lower than the amount of energy required by the premises electricity network.

In alternative embodiments, the energy analytics module is arranged to allow a predetermined amount of energy received via the DC energy input to be delivered to the electricity grid.

In further alternative embodiments, the energy analytics module is arranged to allow an unlimited amount of energy received via the DC energy input to be delivered to the electricity grid.

The amount of energy that can be transferred to the grid may be predetermined and not alterable by the user. For example, it may be set in firmware.

In some embodiments, the premises energy measurement module comprises a communication interface arranged to exchange energy consumption data with energy consuming appliances or circuits installed in the premises in order to measure the amount of energy required by the premises electricity network or part of the premises electricity network.

The communication may be between the energy measurement module and current sensing elements arranged at each appliance's power point. Contactor switches may be also used to control the status of the appliances.

The communication may be between the energy measurement module and current sensing elements arranged on each circuit of the premises at the meter board. Contactor switches may also be used to control the status of the circuits.

In some embodiments, the energy management system comprises a control module arranged to actively control the current sensing contactor switches and switch the power status of appliances or circuits in line with power requirements.

In embodiments, surplus energy received via the DC energy input is directed to a battery for storage and later usage. In alternative embodiments, the control module can actively limit the power produced by the one or more photovoltaic modules.

Any power deficit between the premises requirements and the combined power produced by the system may be met by the grid. If the grid goes down, the system can optionally also turn off for safety reasons or it can supply backup power to one or more appliances, if the electrical standards of the region where the system is installed allow.

In some embodiments, the system further comprises an energy delivery outlet arranged to allow for direct connection of one or more appliances to the system. In these embodiments, the system is capable of operating without connection to the grid (off-grid mode) and provide energy to local appliances directly, or it can supply backup power to directly-connected appliances in the event the grid goes down.

In additional embodiments the system is arranged to draw energy from the electricity grid during predetermined time periods, for example 'off-peak' time periods, and charge one or more batteries connected to the DC energy input during these periods.

In accordance with the second aspect, the present invention provides, a method for distributing energy to premises via an energy management system in accordance with the first aspect, the method comprising:

scanning the DC energy input to detect any connected photovoltaic module or battery;

scanning the premises electricity network to detect any appliances that require energy;

determining, via the energy analytics module, the power requirements of the premises or part of the premises; and delivering the required power to the premises via the premises electricity network interface.

In embodiments, the method further comprises the step of connecting to an administrator cloud platform to search for available remote solar energy via the network interface.

In embodiments, the step of delivering the required power to the premises via the premises electricity network comprises the step of detecting whether solar energy is available on the electricity grid, reserving the solar energy via the administrator cloud platform and delivering the solar energy.

In embodiments, the method further comprises the step of charging one or more batteries connected to the DC energy input where excess solar energy is available from the one or more photovoltaic panels.

In some embodiments, the method further comprises the steps of scanning for remote solar energy available and charging one or more batteries connected to the DC energy input.

In embodiments, the step of delivering the required power to the premises via the premises electricity network interface comprises the step of drawing energy, in order of priority, from one or more photovoltaic modules connected to the DC energy input, any remote solar power accessible available via the grid management module or the electricity grid the premises are connected to, or one or more batteries connected to the DC energy input.

In embodiments, the method further comprises the step of turning off the system if the electricity grid the premises are connected to become unavailable. Alternatively, the method may comprise the step of prompting a user of the system with a request to operate the system in backup mode or off-grid mode.

In accordance with the third aspect, the present invention provides a mounting assembly for a photovoltaic panel; the mounting assembly comprising:

at least two adhesive rails arranged to hold the photovoltaic panel in position;

the at least two adhesive rails arranged to releasably engage the photovoltaic panel.

In embodiments, the mounting assembly comprises an articulated joint arranged to enable movement of the photovoltaic panel held by two retaining rails in relation to the mounting surface Advantageous embodiments of the present invention provide an energy management system that facilitates access to solar energy in a broad range of situations. This includes rooftops but may also encompass a range of other areas including walls, rural areas or campsites, tables or benchtops next to sunny windows, to take advantage of ambient sunlight in a simple way regardless of orientation.

Advantages of embodiments of the system disclosed are related to the simplicity of installation of the photovoltaic modules and batteries. In some instances, these can be self-installed by a user of the system. In addition, the system allows load shifting (storing of off-peak power for consumption during peak periods) to minimise electricity costs to user. The system also facilitates access to solar energy for users that do not have direct access. Furthermore, the system facilitates trading of solar energy between users that own oversized solar to users that have none or undersized systems. This is particularly advantageous when the applicable feed-in tariff is low or non-existent.

BRIEF DESCRIPTION OF THE DRAWINGS

Notwithstanding any other forms which may fall within the scope of the present invention, to make the technology more clearly understood, an embodiment of the technology will now be described, by way of example only, with reference to the accompanying drawings in which.

DETAILED DESCRIPTION OF EMBODIMENTS

Figure 1:
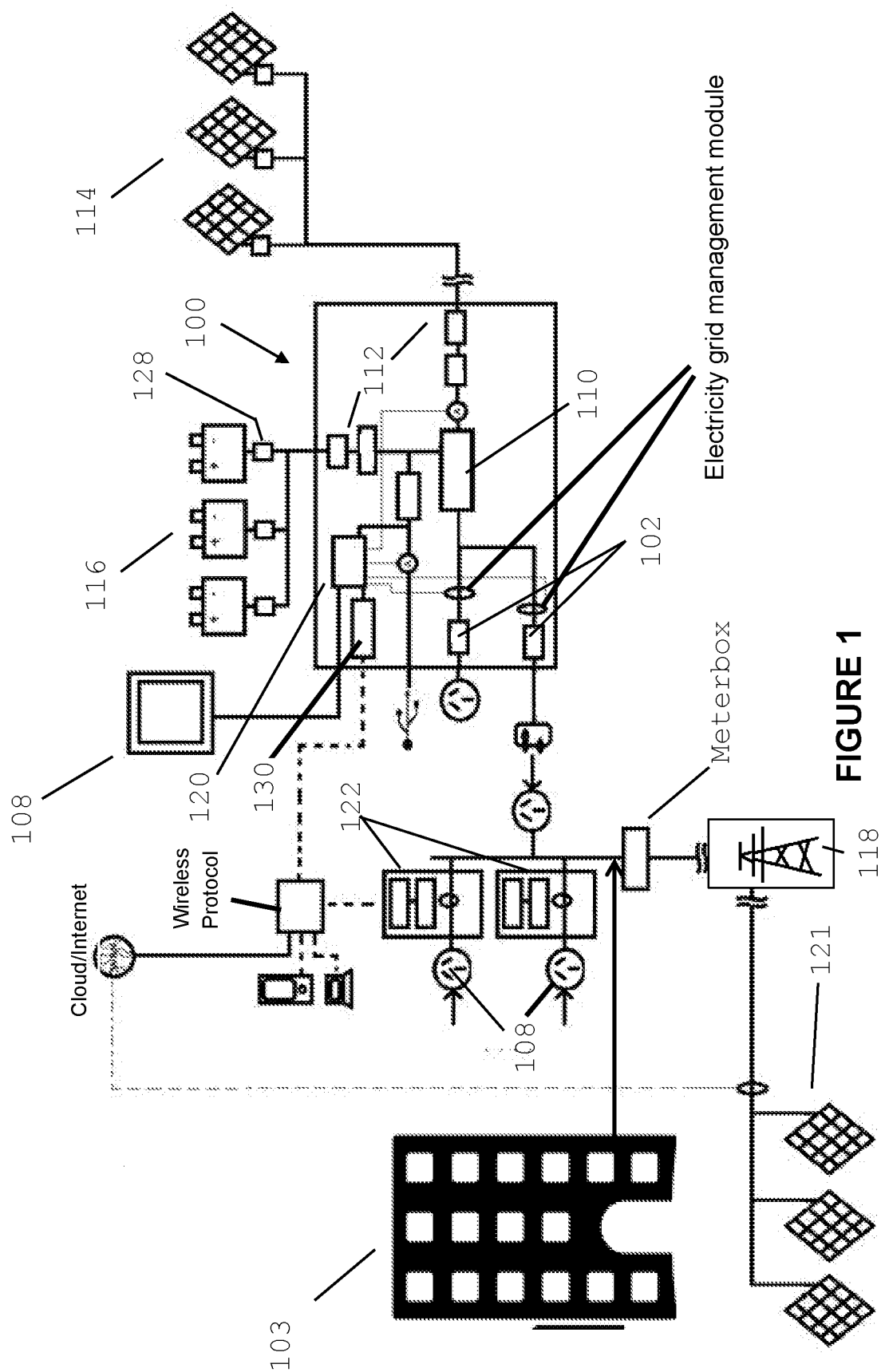
FIGS. 1 and 2 show simplified schematics of the energy management system connected to DC energy sources and a premises electricity network.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

It is to be understood that the terminology employed herein is used for the purpose of describing embodiments only and is not intended to be limiting since the scope of the disclosure will be limited only by the claims and equivalents thereof.

It should be noted in the preceding description that like or the same reference numerals in different embodiments denote the same or similar features.

Embodiments of the invention provide an energy management system that, where the regulatory framework allows, can be self-installed by the user and connected like an appliance to the premises circuitry. In the case of a residential home, the connection may be performed via a wall power point. The system can provide enough power to the home such that the power requirements of the home are met or nearly met and can be setup to not exceed the power requirements so that there is no net power flow out of the house circuitry into the grid when the regulatory framework does not allow.

Referring now to FIG. 1, there is shown a schematic of the energy management system 100 when connected and in operation. The system 100 has a premises electricity network interface 102 that allows delivering energy to a home 103 electricity network 108. The system also comprises an energy measurement module 130 that allows measuring the amount of energy required by the premises electricity network 108.

The system also comprises a DC energy input 112 that allows connecting to one or more DC energy sources. In the example of FIG. 1, the DC energy sources comprise photovoltaic modules 114 and the battery bank 116. The battery bank 116 is managed by an electronic battery management module 128. The energy received by the DC energy input 112 can be stored in the battery bank 116 when not required by the premises electricity network 108.

In most cases, the amount of power delivered by the energy management system 100 on the premises electricity network 108 is lower or matches the power being consumed by the network 108. This allows preventing power from being transferred to the electricity grid 118 through the network 108. Where the regulatory framework allows it, the system 100 can be setup so that a predetermined amount of power, where available, is delivered to the electricity grid 118. This transfer can take place via the connection available between the home electricity network 108 and the electricity grid 118.

Data from the home electricity network 108 and the DC energy input 112 are monitored by an energy analytics module 120 arranged to receive data from current sensing contactor switches 122 and, based on the received data, calculate an amount of energy to be delivered to the premises electricity network 108 via the premises electricity network interface 102 that continuously controls the amount of energy delivered to the home electricity network 108.

The system 100 communicates to household appliances via the home Wi-Fi or a wired communication protocol to be able to determine the total household power requirements. Other communication protocols are used in some instances. The household appliances can be connected to wall power points via current sensing contactor switches 122, which can communicate to the system 100 via the home Wi-Fi network. The contactor switches 122 can also be switched on and off remotely to control operation of the appliance, as can the system itself.

The system 100 includes an inverter module 110 that converts the DC power from the DC energy input 112 to an AC power usable by the appliances connected to the premises electricity network 108. Excess energy produced by the photovoltaic modules 114 can be directed to the battery bank 116.

Any power deficit between the house requirements and the combined power produced by the system 100 may be met by the grid 118. If the grid goes down, the system can optionally turn off for safety reasons or it can supply backup power to one or more appliances. The system 100 is also capable of operating in 'off-grid' portable mode or optionally using off-peak grid power to charge the battery bank 116 for later use during peak periods.

The system 100 has the ability to modulate the power output when exporting power to the premises electricity network 108. The current sensing contactor switches 122 may be BlueCube units that can sense the current power draw on the household circuit, and/or at the GPO socket and transmit this information to the energy measurement module 130 via a wireless protocol (such as Bluetooth, Zigbee or Wi-Fi). The analytics module 120 analyses the information and may correspondingly limit the current output of the inverter to ensure that the power exported by the inverter is always less than the current power draw on the premises electricity network 108.

A control module in the system is arranged to actively control the current sensing contactor switches and switch the power status of appliances in line with power requirements. The control module can also direct surplus energy received via the DC energy input to a battery for storage and later usage. Further, the control module can actively limit the power produced by the one or more photovoltaic modules.

The power limitation can be achieved in one of two ways. By either having a passive parallel element (resistive/shunt) in which excess or undesired power is dumped into the element. Alternatively, the current can be modulated via a network of electronic devices such as active electronic circuitry (transistor-based power limiting circuits) such that the current either drawn from the batteries and input into the inverter, drawn from the photovoltaic panels or outputted from the inverter itself is modulated. The voltage output from the inverter must always be maintained at with acceptable range (for example, 240V).

The system 100 can also communicate with solar panels 121 external to the home. A cloud service enables interaction with the remote panels 121 allowing power from to be purchased from these panels and treated by the system 100 as if it were local. A cloud and retail service can act to facilitate this financial and electrical transaction. The system 100 can also operate off-grid or in portable mode, whereby electrical appliances directly connected to the system via electricity network interface 102 can be powered if enough DC energy is supplied at the DC energy inputs 112, even in the absence of a connection to a home electricity network 108. In this case, the system will deliver the power required by the connected appliances via electricity network interface 102, with any power excess being delivered to the connected battery bank 116.

Figure 2:
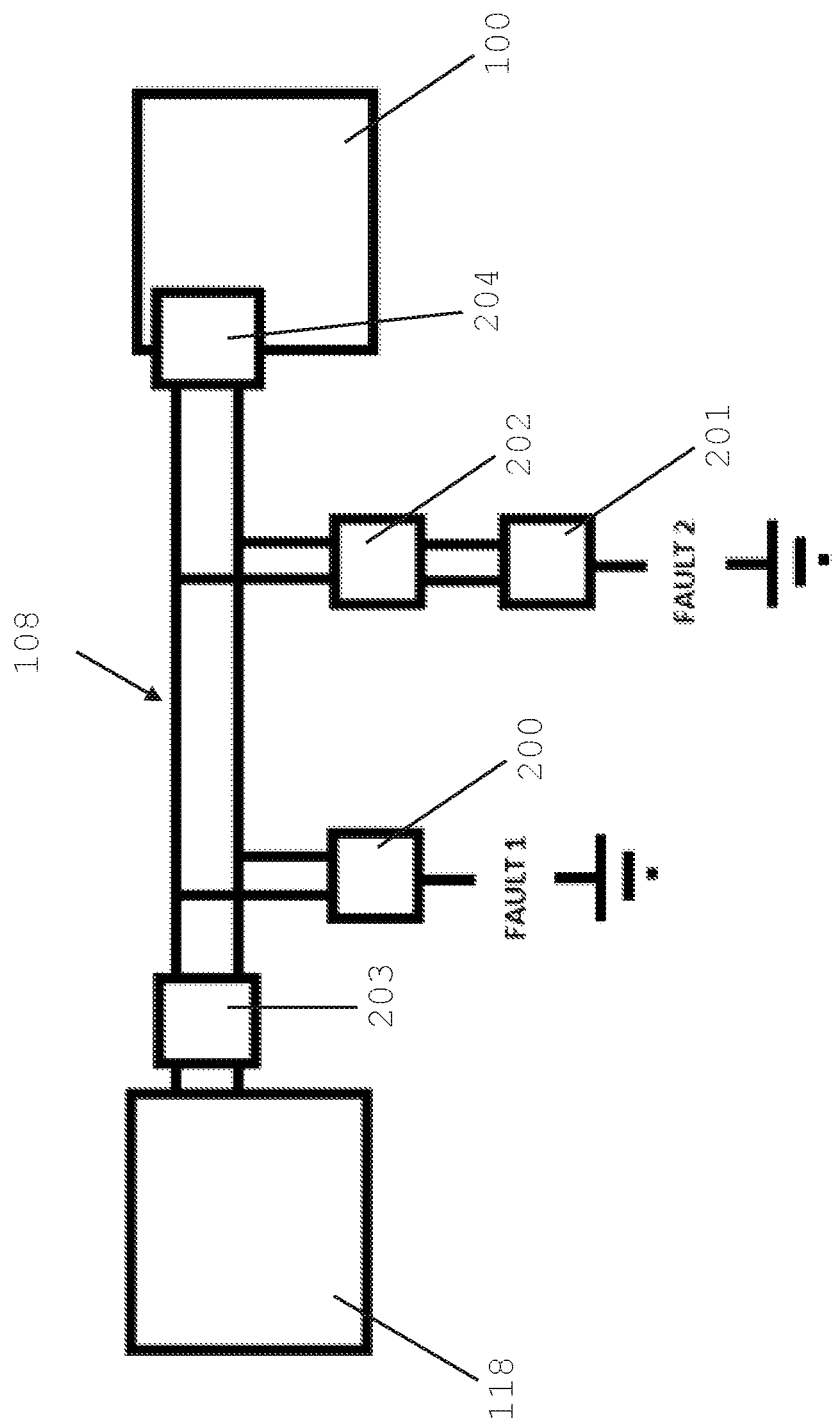

Referring now to FIG. 2, there is shown a schematic of the energy management system 100 when connected to a premises electricity network 108.

FIG. 2 shows house circuitry with two loads, load 200 and load 201 attached across active and neutral on the premises electricity network 108. Load 201 is however connected via a BlueCube unit 202 between it and the premises electricity network 108. Under the default scenario, the system 100 will only provide enough power to power load 201. The BlueCube unit 202 tells the system 100 how much power load 201 is consuming. The grid 118 is supplying power to the premises network 108 as is the system 100. The system 100 does not know load 200 is there, so enough power to power it needs to come from the grid 118. Normally, the additional power required by load 201 comes from the system 100, so no power ever flows back out into the grid 118.

In the case of faults to earth, this results in the active flow being different to the neutral flow in the premises network 108. If a "fault 1" or "fault 2" in FIG. 2 occurs resulting in a current flow to earth, the power from both the grid 118 and the system 100 should break. This necessitates RCD circuit breakers 203 and 204 at both the grid and system interfaces, respectively. This provides good protection against electric shock or fire resulting from earth faults at any load point.

The inverter is equipped with both mechanical and electro-mechanical switches to ensure that power is only exported when a connection is established to the premises electricity network 108. The inverter is also be compliant with AS4777.2:2015 Inverter Standard regarding both the technical requirements, in particular, the anti-islanding protections to ensure that a 'dual-feed' situation is always avoided when the grid is down. Power is supplied to the premises electricity network 108 is via a cable connected from the inverter to the household GPO. To avoid an individual being exposed to dangerous voltages across the connectors of the cable, and to satisfy anti-islanding protections, exposed connectors are encased within a spring-loaded protective "sheath". When the connectors are connected to a wall socket, the sheath retracts. If the sheath is retracted and grid voltage sensed, power export to the house is enabled. If the sheath is retracted at any time and no grid power is sensed, power is not exported (prevents both islanding and electrocution due to individuals touching exposed connectors).

Figure 3:
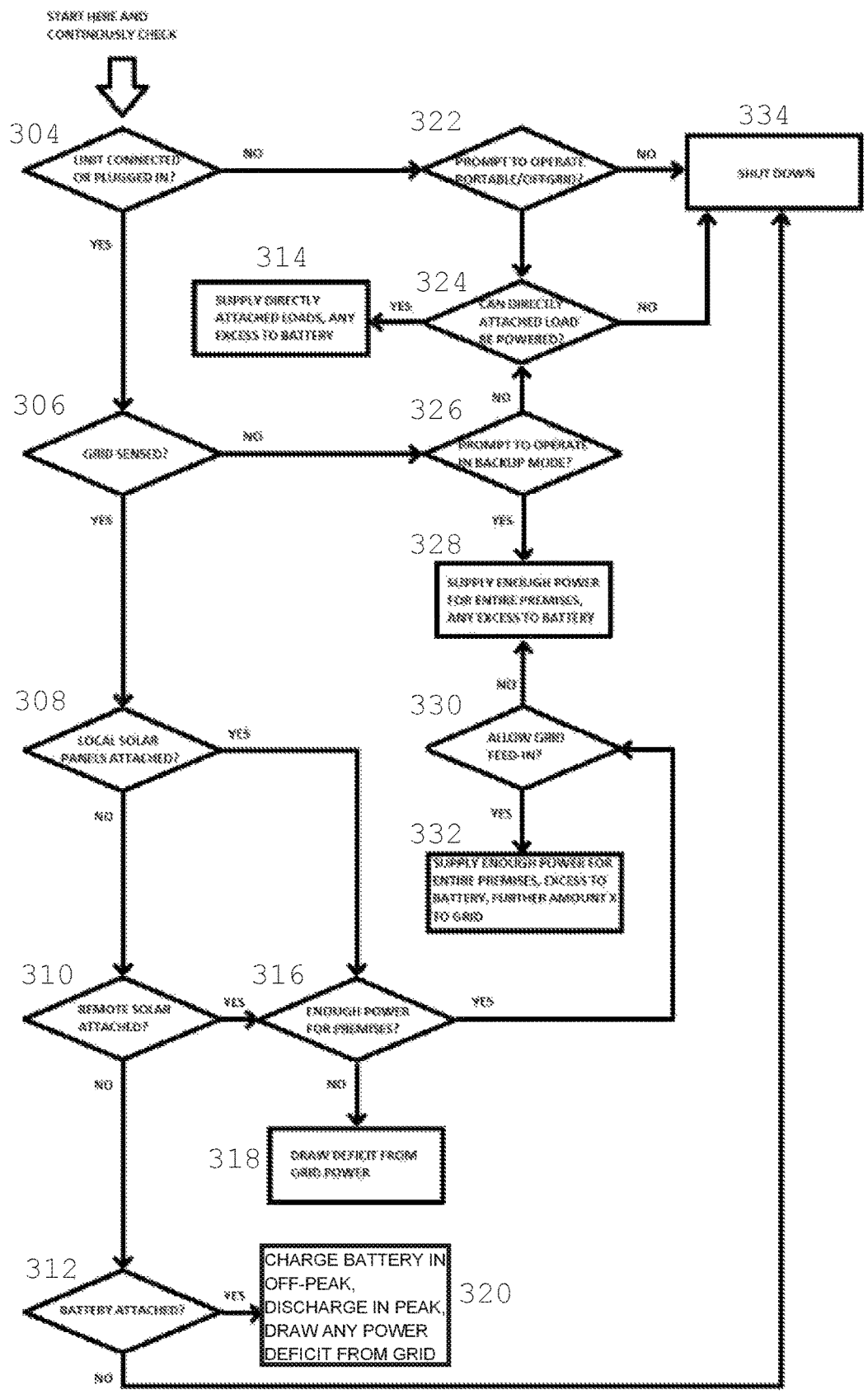
FIGS. 3 and 4 show a flow diagrams with method steps used to distribute energy using the energy management system.

Referring now to FIG. 3, the system 100 will continuously check 304 that it is plugged in or connected to a home electricity network 108. If it is, it will then check for presence of grid voltage 306. If the grid is present, the system 100 will check 308 that local solar panels are connected.

If local solar panels are connected, the system 100 will check 316 that there is enough DC input power available from connected solar panels and/or battery bank to supply the premises power requirement. If not, the system will draw the deficit from the grid as per state 318.

If there is enough power to supply the premises power requirement, the system will check 330 to see if grid feed-in is allowed. If not, the system will operate in state 328 where power excess to premises power requirement is either stored in the battery or modulated such that it is no longer excess to requirement. If grid feed-in is allowed, the system will operate in state 332 where excess power up to a certain amount X is fed back into the grid, or an unlimited excess of power is fed back into the grid.

If in check 306 the grid is found to be down or not present, the system will prompt 326 to operate in grid backup mode. If the answer is yes, the system will operate in state 328 where power is supplied to the premises with any power excess to premises power requirement either stored in the battery or modulated such that it is no longer excess to requirement. If the answer is no, the system will normally operate in state 314, where only directly connected loads are powered, unless local regulation does not allow this or check 324 determines power requirement for directly-connected loads cannot be met, in which case the system 100 will shut down, state 334.

If check 304 determines that the system 100 is unplugged or not connected to home electricity network 108, the system will prompt 322 to operate in portable or off grid mode. If the answer is yes, the system will operate in state 314, where directly connected loads are powered, check 324 determines power requirement for directly-connected loads cannot be met, in which case the system 100 will shut down, state 334. If the answer is no, the system will also shut down, state 334.

If the system does not detect local solar panels in check 308, the system 100 can check 310 that remote solar panels are detected or available. The system can also work with both local and remote solar panels. In these cases, the system 100 will check 316 that there is enough DC input power available from local or remote solar panels and/or battery bank to supply the premises power requirement. If not, the system will draw the deficit from the grid as per state 318. If there is enough power to supply the premises power requirement, the system will check 330 to see if grid feed-in is allowed. If not, the system will operate in state 328 where power excess to premises power requirement is either stored in the battery or modulated such that it is no longer excess to requirement. If grid feed-in is allowed, the system will operate in state 332 where excess power up to a certain amount is fed back into the grid, or an unlimited excess of power is fed back into the grid.

If checks 306 and 308 do not determine that either local or remote solar panels are connected respectively, then the system can check 312 whether any battery is attached. If it is, the system can simply use the battery to store off-peak energy and consume during peak times, drawing any remaining power requirement from the grid, state 320. If no battery is present in check 312, then the system can shut down, state 334.

Figure 4:
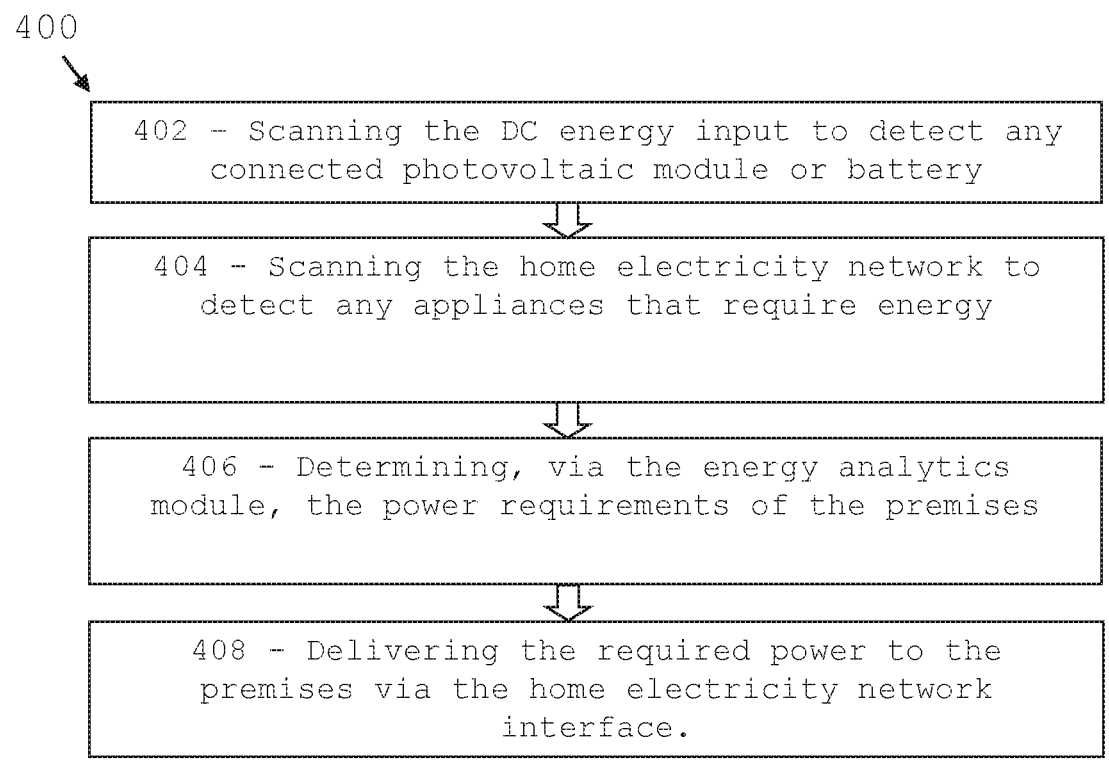

Referring now to FIG. 4 there is shown a flow diagram 400 with a series of steps used to distribute energy to premises using the energy management system described with reference to FIG. 1. At step 402 the DC energy input is scanned to detect any connected photovoltaic module or battery. Subsequently, at step 404, the premises electricity network is scanned to detect any appliances that require energy. The power requirements of the premises are then determined, at step 406, via the energy analytics module and required power is delivered to the premises via the premises electricity network interface, step 408.

Figure 5:
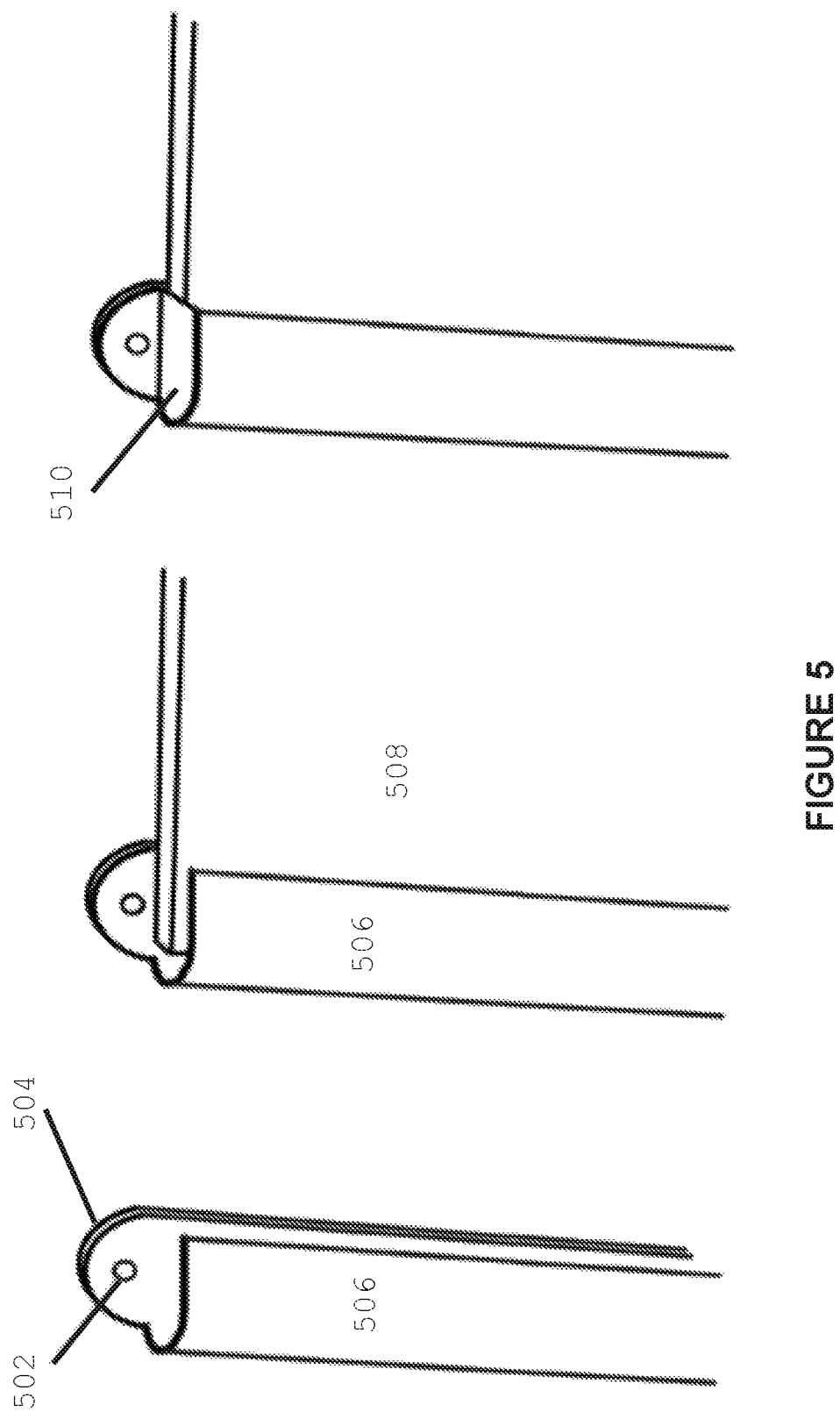
FIGS. 5 and 6 show schematic illustrations of mounting assemblies in accordance with embodiments.
Figure 6:
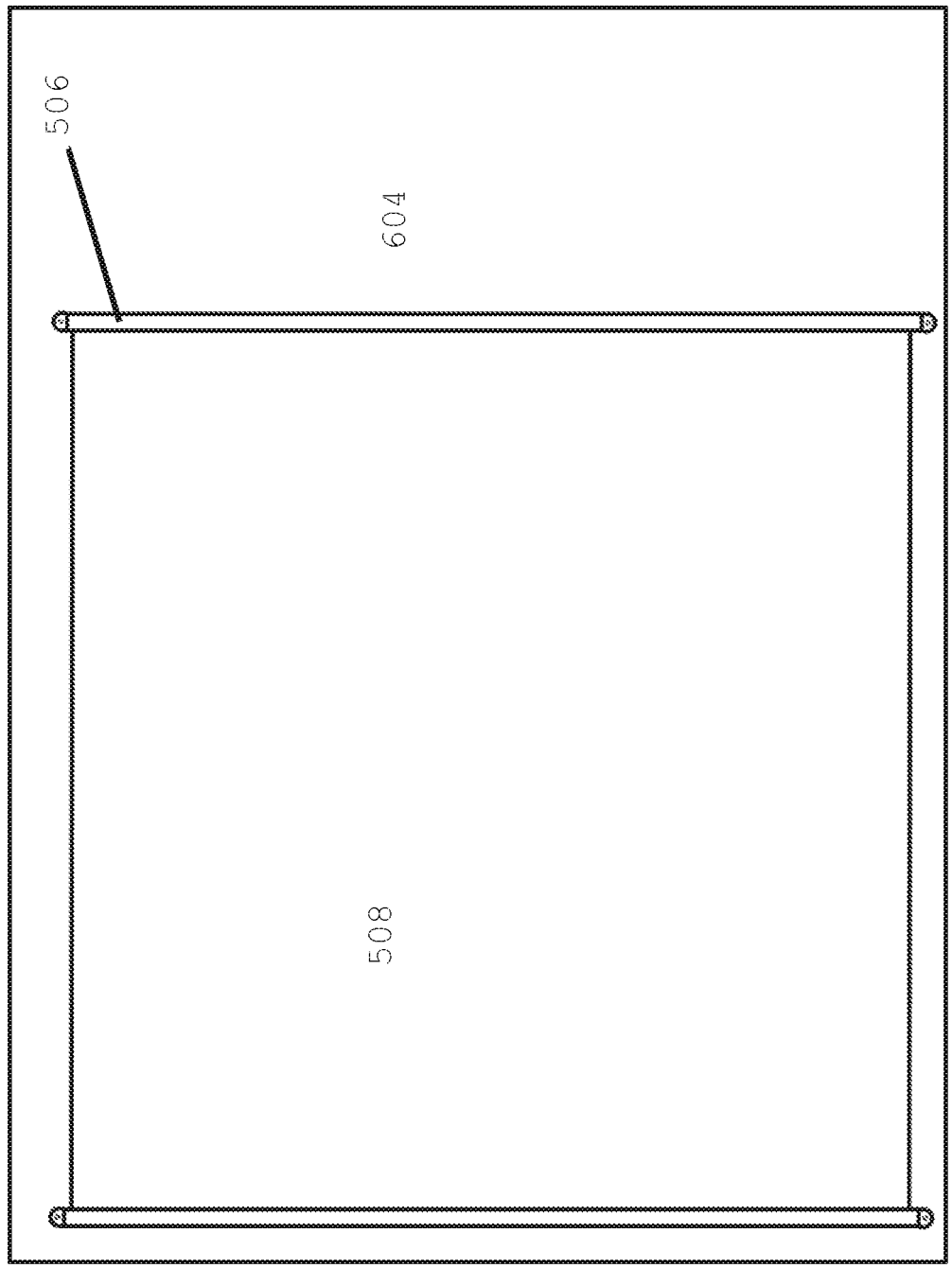

Referring now to FIGS. 5 and 6, there are shown schematic illustrations of mounting assemblies in accordance with embodiments.

Mounting rails 506 with screw holes 502 and adhesive 504 provide a simple way to secure and mount slimline glass-glass solar panels 508 to a fixed surface 604. Stopper ends 510 ensure that the slimline solar panels 508 do not slide out the end of the rails.

The term "comprising" (and its grammatical variations) as used herein are used in the inclusive sense of "having" or "including" and not in the sense of "consisting only of".

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. An energy management system comprising:
   a premises electricity network interface arranged to deliver and draw energy to and from a premises electricity network;
   a premises energy measurement module arranged to measure the amount of energy required by the premises electricity network;
   a DC energy input arranged to receive energy from one or more DC energy sources;
   an energy analytics module arranged to receive data from the energy measurement module and, based on the received data, calculate an amount of energy to be delivered to the premises electricity network via the premises electricity network interface; and
   an electricity grid management module connected to the premises electricity network interface and arranged to detect whether solar energy is available on an electricity grid the premises is connected to.

2. The energy management system of claim 1, wherein the one or more DC energy sources comprise one or more photovoltaic modules, wherein the one or more photovoltaic modules are located at the premises where the energy management system is installed and are wired to an energy meter box at the premises.

3. The energy management system of claim 1, wherein the one or more DC energy sources comprise one or more photovoltaic modules, wherein the one or more photovoltaic modules are self-installed by a user and plugged in to the energy management system.

4. The energy management system of claim 1, wherein, when no local DC energy is available at the DC energy input, the system is arranged to verify, via the grid management module, that remote solar energy is available to be drawn from the electricity grid and deliver solar energy to the premises electricity network.

5. The energy management system of claim 1, wherein the system further comprises a data network interface arranged to connect to a system administrator cloud platform and search for available remote solar energy.

6. The energy management system of claim 1, wherein the energy analytics module is arranged to prevent any energy received via the DC energy input from being delivered to the electricity grid.

7. The energy management system of claim 1, wherein the energy analytics module is arranged to allow a predetermined amount of energy received via the DC energy input to be delivered to the electricity grid, and wherein the amount of energy that can be transferred to the electricity grid is predetermined and not alterable by the user.

8. The energy management system of claim 1, wherein the energy analytics module is arranged to allow an unlimited amount of energy received via the DC energy input to be delivered to the electricity grid.

9. The energy management system of claim 1, wherein the premises energy measurement module comprises a communication interface arranged to exchange energy consumption data with one or more energy consuming appliances or circuits installed in the premises in order to measure the amount of energy required by the premises electricity network.

10. The energy management system of claim 9, wherein a current sensing element is arranged at each appliance's power point or circuit at a meter box and the energy measurement module is arranged to communicate with the one or more current sensing elements.

11. The energy management system of claim 9, wherein a current sensing contactor switch is arranged at each appliance's power point or circuit ata meter box.

12. The energy management system of claim 11, further comprising a control module arranged to actively control the one or more current sensing contactor switches and switch the power status of each appliance or circuit in line with power requirements, wherein the control module is arranged to direct surplus energy received via the DC energy input to a battery for storage and later usage.

13. The energy management system of claim 12, wherein the control module is arranged to actively limit the power produced by one or more photovoltaic modules.

14. The energy management system of claim 1, wherein the system further comprises an energy delivery outlet arranged to allow for direct connection of one or more appliances to the system.

15. A method for distributing energy to premises via an energy management system in accordance with claim 1, the method comprising:
scanning the DC energy input to detect any connected photovoltaic module or battery;
scanning the premises electricity network to detect any appliances that require energy;
determining, via the energy analytics module, the power requirements of the premises; and
delivering the required power to the premises via the premises electricity network interface.

16. The method of claim 15, further comprising the step of connecting to an administrator cloud platform to search for available remote solar energy via the network interface.

17. The method of claim 15, wherein the step of delivering the required power to the premises via the premises electricity network comprises the step of detecting whether solar energy is available on the electricity grid, securing the solar energy via the administrator cloud platform and delivering the solar energy.

18. The method of claim 15, further comprising the step of charging one or more batteries connected to the DC energy input where excess solar energy is available from one or more photovoltaic panels.

19. The method of claim 15, further comprising the steps of scanning for remote solar energy available and charging one or more batteries connected to the DC energy input based on whether remote solar energy is available.

20. The method of claim 15, wherein the step of delivering the required power to the premises via the premises electricity network interface comprises the step of drawing energy, in order of priority, from one or more photovoltaic modules connected to the DC energy input, any remote solar power available via the grid management module or the electricity grid the premises are connected to, and one or more batteries connected to the DC energy input.

21. The method of claim 15, further comprising the step of (i) turning off the system if the electricity grid the premises are connected to becomes unavailable, or (ii) prompting a user of the system with a request to operate the system in off-grid mode, or (iii) prompting a user of the system with a request to operate the system in portable mode, whereby directly connected loads are powered.

22. An energy management system comprising:
a premises electricity network interface arranged to deliver and draw energy to and from a premises electricity network;
a premises energy measurement module arranged to measure the amount of energy required by the premises electricity network;
a DC energy input arranged to receive energy from one or more DC energy sources; and
an energy analytics module arranged to receive data from the energy measurement module and, based on the received data, calculate an amount of energy to be delivered to the premises electricity network via the premises electricity network interface, wherein:
the one or more DC energy sources comprise one or more photovoltaic modules located at the premises where the energy management system is installed; and
the one or more photovoltaic modules are self-installed by a user and plugged in to the energy management system.

23. An energy management system comprising:
a premises electricity network interface arranged to deliver and draw energy to and from a premises electricity network;
a premises energy measurement module arranged to measure the amount of energy required by the premises electricity network;
a DC energy input arranged to receive energy from one or more DC energy sources; and
an energy analytics module arranged to receive data from the energy measurement module and, based on the received data, calculate an amount of energy to be delivered to the premises electricity network via the premises electricity network interface, wherein:
the premises energy measurement module comprises a communication interface arranged to exchange energy consumption data with one or more energy consuming appliances or circuits installed in the premises in order to measure the amount of energy required by the premises electricity network; and
a current sensing contactor switch is arranged at each appliance's power point or circuit at meter box.

* * * * *